US009451743B2

(12) United States Patent
Koerner et al.

(10) Patent No.: US 9,451,743 B2
(45) Date of Patent: Sep. 27, 2016

(54) ROTATING INDUCTION GROW LIGHT SYSTEM

(71) Applicant: GREENGRO HOLDING CORP., Las Vegas, NV (US)

(72) Inventors: Kurt Koerner, Phoenix, AZ (US); Gregory L. Ellison, Phoenix, AZ (US)

(73) Assignee: GGT Holdings Las Vegas Inc., Las Vegas, NV (US)

( * ) Notice: Subject to any disclaimer, the term of this patent is extended or adjusted under 35 U.S.C. 154(b) by 0 days.

(21) Appl. No.: 14/791,124

(22) Filed: Jul. 2, 2015

(65) Prior Publication Data

US 2016/0000019 A1 Jan. 7, 2016

Related U.S. Application Data

(60) Provisional application No. 62/020,317, filed on Jul. 2, 2014.

(51) Int. Cl.
*A01G 29/00* (2006.01)
*A01G 7/04* (2006.01)
(Continued)

(52) U.S. Cl.
CPC ............... *A01G 7/045* (2013.01); *F21S 8/043* (2013.01); *F21V 21/30* (2013.01); *F21V 7/04* (2013.01); *F21V 23/02* (2013.01); *F21W 2131/40* (2013.01); *F21Y 2113/00* (2013.01)

(58) Field of Classification Search
CPC .......... A01G 7/045; A01G 9/00; A01G 7/04; A01G 9/14; A01G 9/20; A01G 9/26; A01G 7/06; F21V 21/30; F21V 23/02; F21V 23/026; F21S 8/043; F21S 8/046; F21S 8/06; F21W 2131/40
USPC ....... 362/1, 227, 249.07, 249.1, 249.11, 260, 362/269, 368, 404, 418, 427; 47/58.1 LS, 47/DIG. 6, 17, 66.6
See application file for complete search history.

(56) References Cited

U.S. PATENT DOCUMENTS 3,882,306 A * 5/1975 Armstrong .............. F21V 21/30
362/427
4,045,911 A * 9/1977 Ware ........................ A01G 9/00
108/23
(Continued)

FOREIGN PATENT DOCUMENTS

GB 2496885 5/2013
WO WO 2005/033580 4/2005
(Continued)

OTHER PUBLICATIONS

Brotherhood Products | Ibeam—Induction Lighting System (w/ 3K Bloom Lamp) Source: http://www.amazon.com/Brotherhood-Products-Ibeam-Single-Source-Horticultural/dp/B00A3010YC/ref=sr_1_3?ie=UTF8&qid=1395938843&sr=8-3&keywords=growing+light+and+induction.
(Continued)

*Primary Examiner* — Trinh Nguyen
(74) *Attorney, Agent, or Firm* — Weide & Miller, Ltd.

(57) ABSTRACT

A rotating induction growth light system and method are disclosed. The rotating induction growth light includes a mounting bracket assembly and a light source assembly rotatably coupled to the mounting bracket assembly. The light source assembly has a first side subassembly and a second side sub assembly opposite the first side subassembly. The light source assembly is configured to rotate between a first position wherein the first side subassembly is facing away from the mounting bracket assembly and at least a second position wherein the second subassembly is facing away from the mounting bracket assembly. A method of providing light to a plant is disclosed, including: directing a vegetative side subassembly of a light source assembly toward a plant; and rotating the light source assembly until a flowering side subassembly is directed toward the plant, the flowering side subassembly positioned on the light source assembly opposite the vegetative side subassembly.

15 Claims, 9 Drawing Sheets

(51) Int. Cl.
  *F21V 21/30*     (2006.01)
  *F21S 8/04*      (2006.01)
  *F21V 7/04*      (2006.01)
  *F21W 131/40*    (2006.01)
  *F21V 23/02*     (2006.01)
  *F21Y 113/00*    (2016.01)

(56) References Cited

U.S. PATENT DOCUMENTS

| | | | | |
|---|---|---|---|---|
| 4,163,342 | A * | 8/1979 | Fogg | A01G 7/045 47/17 |
| 4,396,872 | A * | 8/1983 | Nutter | H05B 37/0227 315/205 |
| 6,042,250 | A | 3/2000 | Stragnola | |
| 6,312,139 | B1 * | 11/2001 | Baker | A01G 9/26 362/145 |
| 6,688,759 | B1 * | 2/2004 | Hadjimichael | A01G 7/045 362/405 |
| 7,329,026 | B1 * | 2/2008 | Hayman | F21S 8/04 362/257 |
| 7,524,090 | B2 * | 4/2009 | Hargreaves | A01G 7/045 362/264 |
| 7,641,367 | B2 | 1/2010 | Hargreaves et al. | |
| 7,832,907 | B2 * | 11/2010 | Kotovsky | F21S 6/007 362/283 |
| 7,972,044 | B2 | 7/2011 | Burkhauser | |
| 8,322,011 | B2 | 12/2012 | Hargreaves | |
| 8,337,037 | B2 * | 12/2012 | Hopkins | F21S 8/043 362/148 |
| 2006/0032115 | A1 * | 2/2006 | Van Den Dool | A01G 9/24 47/17 |
| 2007/0163170 | A1 * | 7/2007 | Brault | A01G 7/045 47/17 |
| 2009/0272029 | A1 * | 11/2009 | Aiking | A01G 7/04 47/1.43 |
| 2009/0272030 | A1 * | 11/2009 | van den Dool | A01G 9/26 47/17 |
| 2011/0302839 | A1 | 12/2011 | Senders et al. | |
| 2013/0188389 | A1 | 7/2013 | Overturf | |
| 2013/0283683 | A1 * | 10/2013 | Ringbom | A01G 9/26 47/58.1 LS |
| 2013/0308325 | A1 * | 11/2013 | Verfuerth | F21V 21/30 362/371 |
| 2013/0329417 | A1 | 12/2013 | Goeschl | |
| 2015/0223402 | A1 * | 8/2015 | Krijn | A01G 7/045 47/58.1 LS |
| 2015/0230409 | A1 * | 8/2015 | Nicole | A01G 7/045 47/17 |
| 2015/0351325 | A1 * | 12/2015 | Shelor | H05B 33/0854 47/58.1 LS |

FOREIGN PATENT DOCUMENTS

| | | |
|---|---|---|
| WO | WO 2010/089455 | 8/2010 |
| WO | WO 2013/049619 | 4/2013 |

OTHER PUBLICATIONS

Smart grow lamps—Open reflectors Powered by induction Source: http://tumalogardenmarket.com/products/smart-grow-lamps/.

Best 1000w Indoor grow light test review & comparison of standard HPS and double ended bulbs Source: http://growershouse.com/blog/best-indoor-grow-light-test/.

* cited by examiner

ROTATING INDUCTION GROW LIGHT SYSTEM

CROSS-REFERENCE TO RELATED APPLICATION

This application claims the benefit of the filing date of U.S. Provisional Patent Application 62/020,317 entitled "ROTATING INDUCTION GROWTH LIGHT SYSTEM", filed on Jul. 2, 2014, which is hereby incorporated by reference in its entirety.

BACKGROUND

1. Technical Field

Aspects of this document relate generally to rotating induction grow light system and method.

2. Background Art

Indoor gardens, green houses, hydroponics systems, and isolated carbon dioxide growing chambers all require light to grow plants. Currently, the most common grow-light source is HID (High Intensity Discharge) lamps constructed from high-pressure sodium and metal halide technologies. The HID lamps have been a mainstay in the indoor gardening market for over 20 years, but they have many problems, such low power efficiencies, high heat discharge, etc.

Attenuation of light is a major issue faced by plant growers around the world. Plant growers would prefer to position the light fixture close and above the growing plants in order to limit the effects of attenuation. It is desirable to locate the fixture as close to the plants as possible, without causing heat impact on the plants that will stunt development or kill the plants. With HID lamps, this is hard to do because of the heat that these lamps produce.

Heat produced by a light fixture is always a design challenge and concern. The HID lamps by consequence of high lumen output with low power efficiencies produce undesirable amounts of heat. The thermal pollution or heat generated must then be isolated and removed from the growing environment. Thus, in addition to trying to cool the lamps themselves, roof vents of the greenhouse typically need to be opened to lower the inside temperature. This then wastes energy and removes from the greenhouse carbon dioxide that has been added therein and that the plants need for photosynthesis.

Greenhouse plants are typically illuminated by fastening light fixtures above the plants on support structures. This poses problems though when lamps or light bulbs need to be changed. Fluorescent lamps have been a market standard for starting plants or developing plants, leaving the flowering and fruiting yields to HID lamps. This requires growers to store and have on hand two different lamps or at the very least two different light bulbs. This is costly, not only in terms of storage and space, but also in the labor that is required to switch out bulbs and/or lamps at the different stages of plant growth.

SUMMARY

Aspects of this document relate generally to a rotating induction grow light system. These aspects may comprise, and implementations may include, one or more or all of the components and steps set forth in the appended claims, which are hereby incorporated by reference.

In a general aspect, a rotating induction grow light system may include a dual or two sided hooded or light source assembly, wherein one side of the hood or light source assembly is used to provide light to plants in a vegetative or growing state, and the other side of the hood or light source assembly is used to provide light to plants in a flowering state. A ballast is typically mounted in between induction light bulbs on the bottom side and the top side of the light source assembly, and each side has its own reflectors. The light source assembly typically includes a rotation mechanism that allows the dual hood light source assembly to flip longitudinally 360 degrees, including the ability to lock in place at 0/360 degrees and at 180 degrees. The operating temperature, according to some aspects, is no more than 180 degrees Fahrenheit.

In another aspect, a rotating induction growth light system is disclosed that includes a mounting bracket assembly. A light source assembly is rotatably coupled to the mounting bracket assembly, the light source assembly comprising a first side subassembly and a second side sub assembly opposite the first side subassembly, wherein the light source assembly is configured to rotate between a first position wherein the first side subassembly is facing away from the mounting bracket assembly and at least a second position wherein the second subassembly is facing away from the mounting bracket assembly.

Particular implementations may include one or more or all of the following.

The light source assembly may further include a ballast mount rotatably coupled to the mounting bracket assembly and positioned between the first side subassembly and the second side subassembly. The second side subassembly may include a reflector plate coupled to the ballast mount and a plurality of induction light bulbs coupled to the reflector plate. The first side subassembly may include a reflector plate coupled to the ballast mount and a plurality of induction light bulbs coupled to the reflector plate.

The first side subassembly may include a reflective cone.

The plurality of induction light bulbs of the second side subassembly may produce a first combined wattage and the plurality of induction light bulbs of the first side subassembly may produce a second combined wattage less than the first combined wattage.

The mounting bracket assembly may include two arms and a body coupled to and between the two arms, at least one of the two arms comprising a track, and wherein the ballast mount comprises a stop tab slidable within the track such that when the light source assembly is in the first position the stop tab is engaged with a first end of the track and when the light source assembly is in the second position the stop tab is engaged with a second end of the track.

An indexing plunger operably coupled to the at least one of the two arms proximate the track. A plurality of plunger receiving holes may be included on the ballast mount proximate the stop, wherein a first plunger receiving hole of the plurality of plunger receiving holes is positioned to engage with the indexing plunger when the light source assembly is in the first position, a second plunger receiving hole of the plurality of plunger receiving holes is positioned to engage with the indexing plunger when the light source assembly is in the second position, and a third plunger receiving hold of the plurality of plunger receiving holes is positioned to engage with the indexing plunger when the light source assembly is in a third position between the first and the second positions.

A plurality of ballasts may be coupled to the ballast mount.

The plurality of induction light bulbs of the second side subassembly may include two 300 watt bulbs, two 150 watt bulbs, and one 100 watt bulb, and the plurality of induction light bulbs of the first side subassembly may include two 300 watt bulbs and two 150 watt bulbs.

The plurality of induction light bulbs of both the first and second side subassemblies may include two 500 watt bulbs.

In still another aspect, a rotating induction growth light system is disclosed that includes a mounting bracket assembly. A light source assembly may be rotatably coupled to the mounting bracket assembly. The light source assembly may include a vegetative side subassembly and a flowering side sub assembly opposite the vegetative side subassembly, wherein the light source assembly is configured to rotate between a first position wherein the vegetative side subassembly is facing away from the mounting bracket assembly and at least a second position wherein the flowering subassembly is facing away from the mounting bracket assembly.

Particular implementations may include one or more or all of the following.

The light source assembly may include a ballast mount rotatably coupled to the mounting bracket assembly and positioned between the vegetative side subassembly and the flowering side subassembly. The flowering side subassembly may include a reflector plate coupled to the ballast mount and a plurality of induction light bulbs coupled to the reflector plate. The vegetative side subassembly may include a reflector plate coupled to the ballast mount and a plurality of induction light bulbs coupled to the reflector plate of the vegetative side subassembly.

The vegetative side subassembly may include a reflective cone.

The plurality of induction light bulbs of the flowering side subassembly may produce a first combined wattage and the plurality of induction light bulbs of the vegetative side subassembly may produce a second combined wattage less than the first combined wattage.

The mounting bracket assembly may include two arms and a body coupled to and between the two arms, at least one of the two arms comprising a track, and wherein the ballast mount comprises a stop tab slidable within the track such that when the light source assembly is in the first position the stop tab is engaged with a first end of the track and when the light source assembly is in the second position the stop tab is engaged with a second end of the track.

An indexing plunger may be operably coupled to the at least one of the two arms proximate the track. A plurality of plunger receiving holes may be included on the ballast mount proximate the stop, wherein a first plunger receiving hole of the plurality of plunger receiving holes is positioned to engage with the indexing plunger when the light source assembly is in the first position, a second plunger receiving hole of the plurality of plunger receiving holes is positioned to engage with the indexing plunger when the light source assembly is in the second position, and a third plunger receiving hold of the plurality of plunger receiving holes is positioned to engage with the indexing plunger when the light source assembly is in a third position between the first and the second positions.

The plurality of induction light bulbs of the flowering side subassembly may include two 300 watt bulbs, two 150 watt bulbs, and one 100 watt bulb, and the plurality of induction light bulbs of the vegetative side subassembly may include two 300 watt bulbs and two 150 watt bulbs.

The plurality of induction light bulbs of both the first and second side subassemblies may include two 500 watt bulbs.

In yet another aspect, a method of providing light to a plant is disclosed that may include: directing a vegetative side subassembly of a light source assembly toward a plant, the light source assembly rotatably coupled to a mounting bracket assembly; and rotating the light source assembly until a flowering side subassembly is directed toward the plant, the flowering side subassembly positioned on the light source assembly opposite the vegetative side subassembly.

Particular implementations may include one or more or all of the following.

The method may further include: engaging an indexing plunger on an arm of the mounting bracket assembly in a first plunger receiving hole on the light source assembly when the vegetative side subassembly is directed toward the plant; and engaging the indexing plunger in a second plunger receiving hole on the light source assembly when the flowering side subassembly is directed toward the plant.

The method may further include rotating the light source assembly into a storage position and engaging the indexing plunger with a third plunger receiving hole on the light source assembly.

Aspects a rotating induction grow light system may have one, or more, or all of the following advantages and benefits. A rotating induction growth light assembly contemplated herein is advantageous to previous light assemblies because it provides an all-in-one horticultural lighting system for both maximum vegetative and flowering growth and yields. As a result, the operator is no longer required to change vegetative lamps to bloom lamps or switch out bulbs for vegetative growth with bulbs for flowering. The operator is also no longer required to store vegetative and bloom lamps or bulbs for vegetative growth and bulbs for flowering. The operator is further not burdened by extra labor and costs to switch out vegetative lamps and bloom lamps or bulbs for vegetative growth and bulbs for flowering. According to some aspects, the bulbs last 5 times longer than HID and twice as long as LED; the bulbs and ballasts may be guaranteed for 5 years and the data shows it will last for 10; the bulbs may use 60% less electricity than a 1000 watt HID; the bulbs may produce so little heat, one will use 70% less power to cool a room.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This document features a rotating induction grow light system. There are many features of rotating induction grow light system and method implementations disclosed herein, of which one, a plurality, or all features or steps may be used in any particular implementation.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Structure/Components

There are a variety of implementations of a rotating induction grow light system. Implementations of a rotating induction grow light system may include a dual or two sided hooded or light source assembly, wherein one side of the hood or light source assembly is used to provide light to plants in a vegetative or growing state, and the other side of the hood or light source assembly is used to provide light to plants in a flowering state. A ballast is typically mounted in between induction light bulbs on the bottom side and the top side of the light source assembly, and each side has its own reflectors. The light source assembly typically includes a rotation mechanism that allows the dual hood light source assembly to flip longitudinally 360 degrees, including the ability to lock in place at 0/360 degrees and at 180 degrees.

Figure 1:
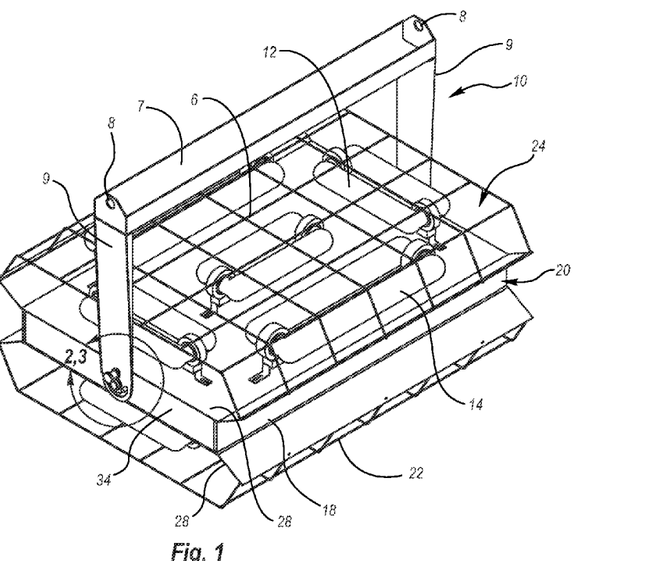
FIG. 1 is a perspective view of a rotating induction growth light system.

For the exemplary purposes of this disclosure, FIG. 1 depicts a perspective view of a non-limiting implementation of a rotating induction growth light system. According to some aspects, a rotating induction growth light system includes a mounting bracket assembly 10 and a light source assembly 20 rotatably coupled to the mounting bracket assembly 10. In the particular implementation depicted in FIG. 1, the mounting bracket assembly 10 is a hanging bracket assembly, although it also contemplated that the bracket assembly may include a height-adjustable standing bracket assembly for example or some other type of bracket assembly. In one or more implementations, the bracket assembly includes a body 7 and two arms 9 coupled to the body 7. Either the body 7 or arms 9 may include one or more holes 8 for hanging the mounting bracket assembly. Although not shown in the figures of this application, it is contemplated that the mounting bracket assembly 10 may work in conjunction with a rope ratchet hanging system previously known in the art and couple to the mounting bracket assembly through one or more holes 8.

Figure 2:
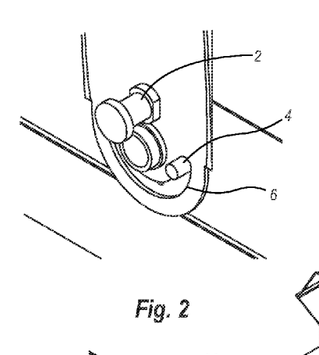
FIG. 2 is a perspective view from FIG. 1 enlarged for magnification purposes of rotational coupling of a light source system and mounting bracket assembly of a rotation induction growth light system.

As depicted in FIG. 2, according to some aspects, one or more arms 9 of the mounting bracket assembly 10 include an indexing plunger 2 coupled thereto and/or a track 6. The indexing plunger 2 and the track 6 are typically positioned proximate one another on an end of the arm distal the body 7. It is contemplated, however, that each of the indexing plunger 2 and the track 6 may be positioned in any suitable position on the arm 7. The indexing plunger 2 may include any indexing plunger known in the art, and thus may include a pin that extends from the arm 9 of the mounting bracket assembly 10 to interface with an end cap 34 coupled to the ballast mount 18. Additional details of the indexing plunger 2 and track 6 shall be described in greater detail in conjunction with aspects of the light source assembly 20.

As further depicted in the non-limiting implementation of FIG. 1, a light source assembly 20 may include a flowering side subassembly 24 and a vegetative side subassembly 22 opposite the flowering side subassembly 24. The particulars of each subassembly 22, 24 shall be described in greater detail below. The flowering side subassembly 24 and the vegetative side subassembly 22 are typically coupled to a ballast mount 18 that is positioned between the two subassemblies 22, 24.

Figure 3:
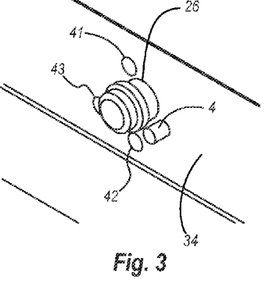
FIG. 3 is a perspective view from FIG. 1 enlarged for magnification purposes of an end cap of a light source assembly.

According to some aspects, the mounting bracket assembly 10 is rotatably coupled to the light source assembly 20 at an end cap 34 coupled to the ballast mount 18. For example, in the non-limiting implementation depicted in FIGS. 1-3, the end cap 34 includes a rotation bushing 26. FIG. 3 depicts a non-limiting implementation of a rotation bushing 26 on an end cap 34. Other implementations may include any rotation coupling previously known in the art. The rotatable coupling of the light source assembly 20 to the mounting bracket assembly 10 allows for rotation of the light source assembly 20 between a first position wherein the vegetative side subassembly 22 is facing downward or away from the body 7 of the mounting bracket assembly 10 (shown in FIGS. 11C and 12) and at least a second position wherein the flowering side subassembly 24 is facing downward or away from the body 7 of the mounting bracket assembly 10 (shown in FIGS. 11B and 14). In some implementations, the rotatable coupling of the light source assembly 20 to the mounting bracket assembly 10 further allows for rotation to at least a third position wherein the end cap 34 is substantially parallel and/or planar with the arms 9 of the mounting bracket assembly (shown in FIG. 11A). In implementations wherein the mounting bracket assembly 10 includes an adjustable standing mounting bracket assembly, the light source assembly is still rotatable between the described positions as will be understood to one of ordinary skill in the art upon review of this disclosure.

According to some aspects, the mounting bracket assembly 10 further includes one or more stop tabs 4. The stop tab 4 typically extends from the end cap 34 coupled to the ballast mount 18 coupled to an arm 9 of the mounting bracket assembly 10 and is positioned to engage with the track 6 of the arm 9. In some implementations each arm 9 includes one track 6 that engages with a different stop tab 4. In other implementations, only one arm 9 includes one track 6 that engages with a stop tab 4. As depicted in FIG. 2, the track 6 may include a semicircle or arced track 6 that guides the stop tab 4 as the light source assembly is rotated. In such an implementation, rotation of the light source assembly 20 is limited by engagement between the track 6 and the stop tab 4 to approximately 180 degrees. For example, the stop tab 4 engages with a first end of the track 6 when the light source assembly 20 is in the first position, and engages with a second end of the track 6 when the light source assembly 20 is in the second position. In other implementations, the track 6 may include a circular track that allows for 360 degree rotation of the light source assembly 20.

As depicted in FIG. 3, one or more implementations of a light source assembly 20 further include one or more plunger receiving holes. The plunger receiving holes are typically positioned on the end cap 34 to engage with the indexing plunger 2 in when the light source assembly 20 is in various positions to hold or stabilize the light source assembly 20 in a prescribed position. For example, a first plunger receiving hole 41 may be positioned on the end cap 34 to engage with the indexing plunger 2 when the light source assembly 20 is in the first position. A second plunger receiving hole 42 may be positioned on the end cap 34 to engage with the indexing plunger 2 when the light source assembly 20 is in the second position. A third plunger receiving hole 43 may be positioned on the end cap 34 to engage with the indexing plunger 2 when the light source assembly 20 is in the third position.

Figure 4:
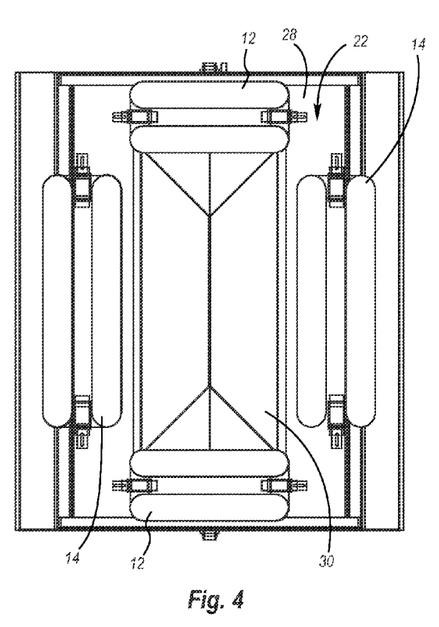
FIG. 4 is a front view of a vegetative side subassembly of a light source assembly.

FIG. 4 depicts a non-limiting front view of a vegetative side subassembly 22. The vegetative side subassembly 22 is configured to provide light that is more ideal or preferred to plants in a vegetative stage. Accordingly, the vegetative side subassembly 22 may include fewer bulbs and/or less combined wattage produced by the bulbs, as well as a reflective cone 30 extending from a reflector plate 28 of the vegetative side subassembly. According to some aspects, the vegetative side subassembly 22 includes equal numbers of higher wattage bulbs 14 and lower wattage bulbs 12. More particularly, the vegetative side subassembly 22 may include two higher wattage bulbs 14 and two lower wattage bulbs 12. Even more particularly, the two higher wattage bulbs 14 of the vegetative side subassembly 22 may each include 300 watt bulbs, and the two lower wattage bulbs 12 of the vegetative side subassembly 22 may each include 150 watt bulbs. It is contemplated that other implementations may include other lighting configurations, including other total and individual watts of variously positioned bulbs. For example, two 500 watt bulbs may be included on the side subassembly. In some implementations, the bulbs 12, 14 include full PAR spectrum daylight vegetative and flowering bulbs, and may range from 100 watts to 400 watts and may be 6500K bulbs for example.

Figure 5:
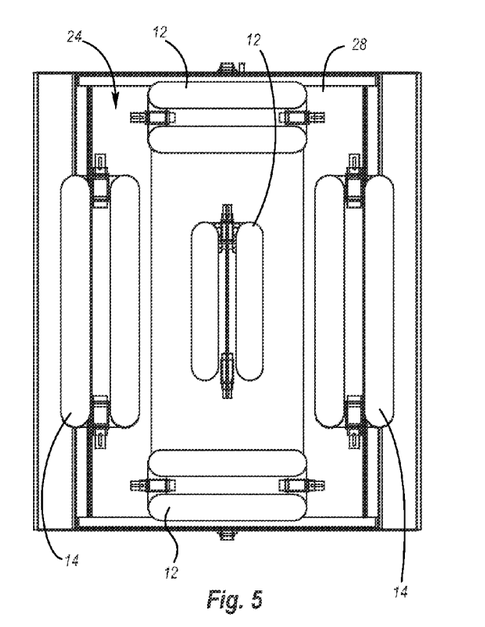
FIG. 5 is a front view of a flowering side subassembly of a light source assembly.

FIG. 5 depicts a non-limiting front view of a flowering side subassembly 24. The flowering side subassembly 24 is configured to provide light that is more ideal or preferred to plants in a flowering stage. Accordingly, the flowering side subassembly 24 may include more bulbs and/or greater combined wattage produced by the bulbs that the vegetative side subassembly 22. The flowering side subassembly 24 includes a reflector plate 28. According to some aspects, the flowering side subassembly 24 includes fewer higher wattage bulbs 14 than lower wattage bulbs 12. More particularly, the flowering side subassembly 24 may include two higher wattage bulbs 14 and three lower wattage bulbs 12. Even more particularly, the two higher wattage bulbs 14 of the flowering side subassembly 24 may each include 300 watt bulbs, and the three lower wattage bulbs 12 of the flowering side subassembly 24 may each include 150 watt or 100 watt bulbs. It is contemplated that other implementations may include other lighting configurations, including other total and individual watts of variously positioned bulbs. For example, two 500 watt bulbs may be included on the side subassembly. In some implementations, the bulbs 12, 14 include full PAR spectrum daylight vegetative and flowering bulbs, and may range from 100 watts to 400 watts and may be 1700K to 2100K bulbs for example.

Figure 6:
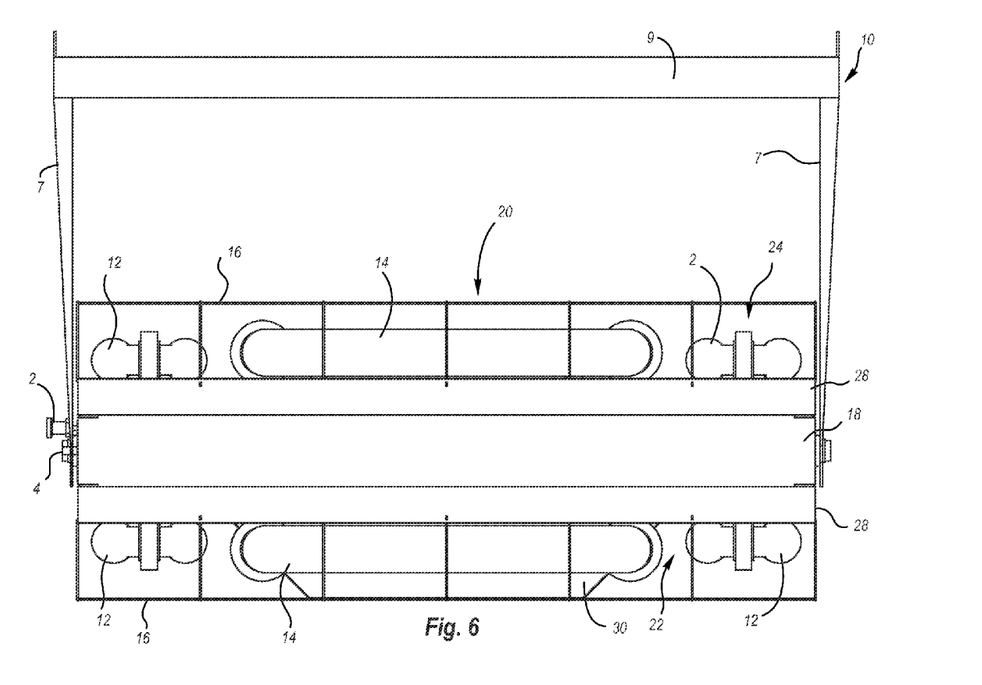
FIG. 6 is a side view of a rotating induction growth light system.

FIG. 6 depicts a side view of a non-limiting implementation of a light source assembly 20 rotatably coupled to a mounting bracket assembly 10 with the light source assembly 20 in the second position, that is the vegetative side subassembly 22 facing downward away from the body 9 of the mounting bracket assembly 10. In this particular implementation, the mounting bracket assembly 10 includes only a single indexing plunger 2 and a single track 6, and the light source assembly 20 includes only a single stop tab 4.

Figure 7:
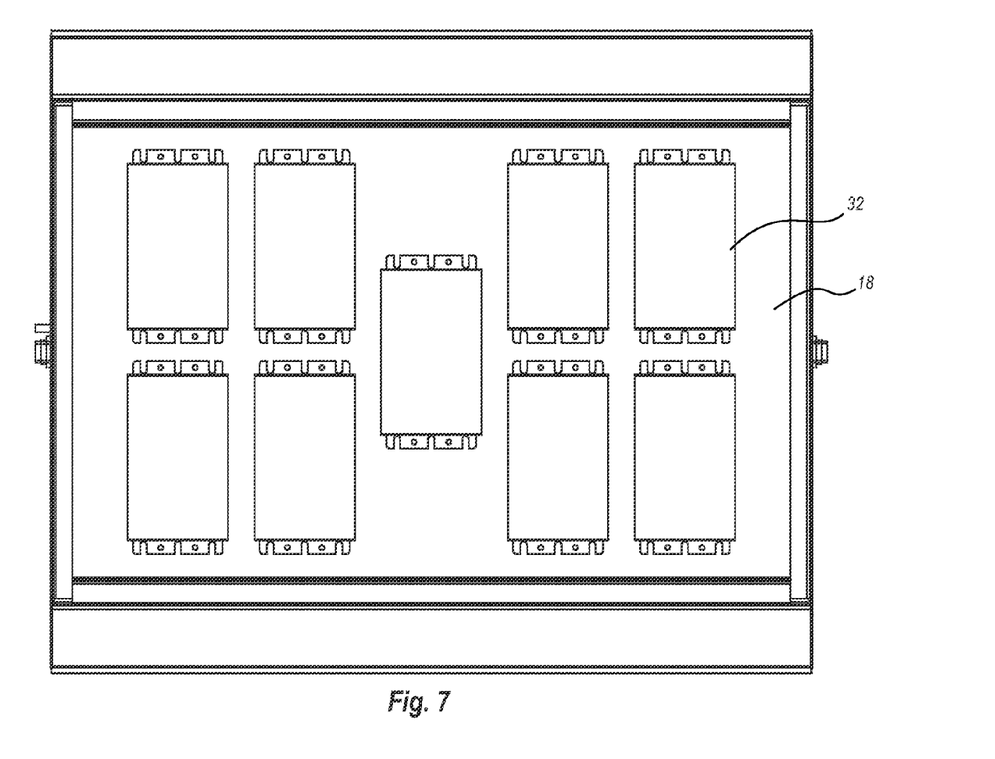
FIG. 7 is a front view of ballasts of a light source assembly.

FIG. 7 depicts a non-limiting implementation of a plurality of ballasts 32 coupled to the ballast mount 18. The ballasts 32 may include any ballasts known in the art and suitable for the light source assembly 20 described herein. According to some aspects, the ballasts 32 may be variable, and run between 120 volts up to 277 volts, as well as anywhere in-between. In some implementations, a 480 volt adaptor may be utilized.

Figure 8:
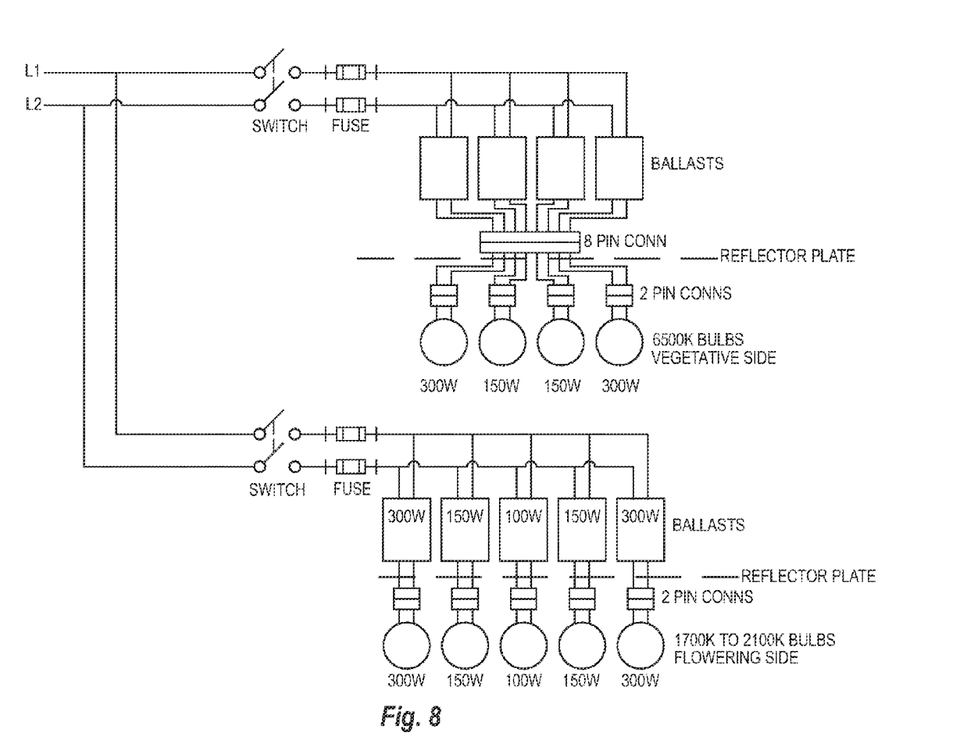
FIG. 8 is a circuit diagram of a light source assembly.

FIG. 8 depicts a non-limiting circuit diagram of a light source assembly 20 contemplated herein. The number of ballasts, number of bulbs, and wattage of bulbs depicted in the circuit diagram of FIG. 8 is by way of example only. In is contemplated that other circuit diagrams will be appropriate for use with the described light source assembly 20. For example, four ballasts may be provided instead.

Figure 9:
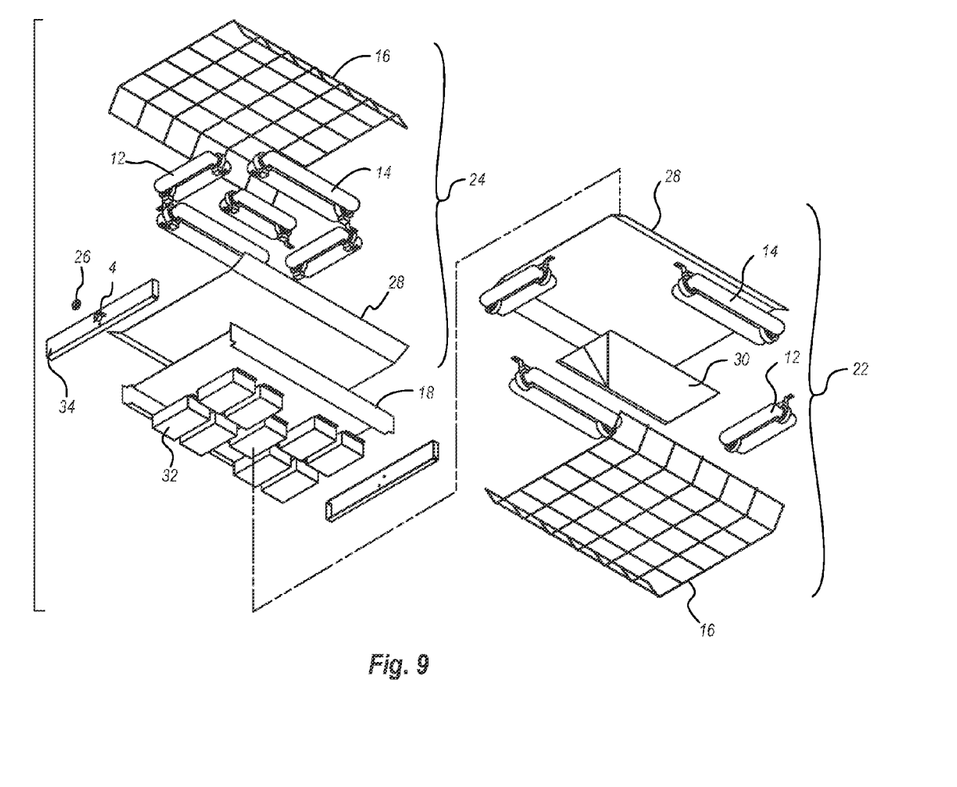
FIG. 9 is an exploded view of a light source assembly.
Figure 10:
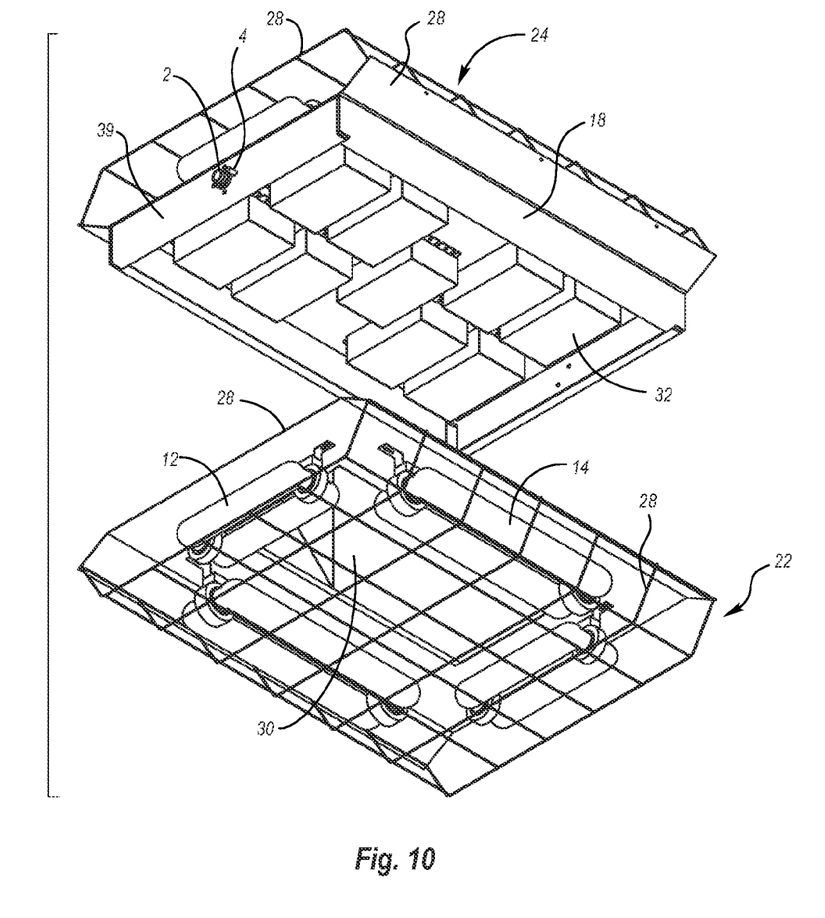
FIG. 10 is an exploded perspective view of a light source assembly with a vegetative side subassembly separated from a flowering side subassembly for viewing of the ballasts.

FIGS. 9 and 10 depict exploded views of a light source assembly 20. According to some aspects, the flowering side subassembly 24 includes a wire screen cover 16, a plurality of bulbs 12, 14, and a reflector plate 28. According to some aspects, the vegetative side subassembly 22 includes a wire screen cover 16, a plurality of bulbs 12, 14, a reflective cone 30, and a reflector plate 28. The ballasts 32 are typically coupled to a ballast mount 18 positioned between the vegetative side subassembly 22 and the flowering side subassembly 24. The light source assembly 20 may further include one or more end caps 34.

Figures 11A, 11B, 11C:
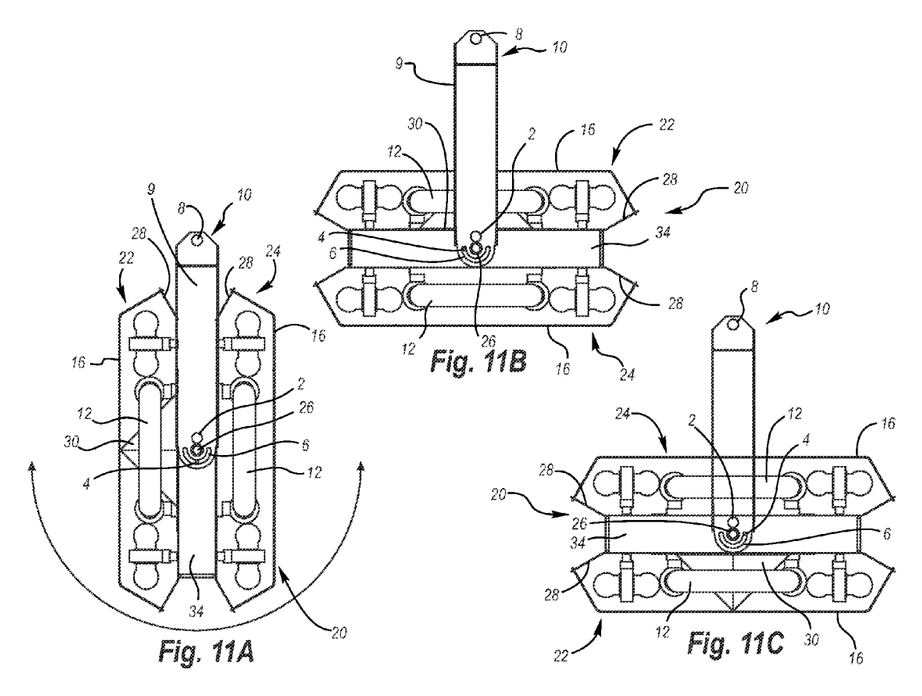
FIGS. 11A-C are side views of a rotating induction growth light system at a storage/shipping position, a flowering position, and a vegetative position respectfully.

FIGS. 11A-C depict light source assembly 20 in various positions relative to the mounting bracket assembly 10. In FIG. 11A, the light source assembly 20 is in the storage or third position referenced above wherein the end cap 34 is substantially parallel and/or planar to the arms 9 of the mounting bracket assembly 10. In FIG. 11B, the light source assembly 20 has been rotated from the third position shown in FIG. 11A to the second position referenced above, wherein the flowering side subassembly 24 is facing away from the body 7 of the mounting bracket assembly 10. In FIG. 11C, the light source assembly 20 has been rotated to the first position referenced above, wherein the vegetative side 22 subassembly is facing away from the body 7 of the mounting bracket assembly 10. FIGS. 11A-C also depict movement of the stop tab 4 within the track 6 at the various positions of the light source assembly 20.

Other Implementations

Other implementations are possible for a wide variety of applications.

For the exemplary purposes of this disclosure, a body may define any number of bottom and corresponding top bottle recesses in any arrangement. That is a body of a bottle stacker implementation may define recesses to accommodate two bottles (one on top of one), four bottles (two on top of two), six bottles (three on top of three), eight bottles (four on top of four), and so on.

Further implementations are within the claims and discussed elsewhere in this document.

Specifications, Materials, Manufacture, System, and Installation

It will be understood that rotating induction growth light system implementations are not limited to the specific assemblies, devices and components disclosed in this document, as virtually any assemblies, devices and components consistent with the intended operation of a rotating induction growth light system implementation may be utilized. Accordingly, for example, although particular lamps, electrical connectors, coatings, reflectors, frames, power cables, positionable adjustment mechanisms, and other assemblies, devices and components are disclosed, such may include any shape, size, style, type, model, version, class, measurement, concentration, material, weight, quantity, and/or the like consistent with the intended operation of a rotating induction growth light system implementation. Implementations are not limited to uses of any specific assemblies, devices and components; provided that the assemblies, devices and components selected are consistent with the intended operation of a rotating induction growth light system implementation.

Accordingly, the components defining any rotating induction growth light system implementations may be formed of any of many different types of materials or combinations thereof that can readily be formed into shaped objects provided that the components selected are consistent with the intended operation of a rotating induction growth light system implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of a rotating induction growth light system implementations may vary according to different implementations. According to some aspects, the reflective cone 30 includes a 90 degree angle at the point of the reflective cone 30, and to 45 degree angles proximate the reflector plate 28. The ends of each reflector plate 28 may be angled at an angle of approximately 150 degrees. The reflector plates 28 and reflective cone 30 may include any reflective material, including but not limited to mylar applied to a reflective surface.

Various rotating induction growth light system implementations may be manufactured using conventional procedures as added to and improved upon through the procedures described here. Some components defining rotating induction growth light system implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here and illustrated in FIGS. 8-10.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of rotating induction growth light systems are not limited to the specific order of steps as disclosed in this document and FIGS. 8-10. Any steps or sequence of steps of the assembly of rotating induction growth light systems indicated herein are given as examples of possible steps or sequence of steps and not as limitations, since various assembly processes and sequences of steps may be used to assemble rotating induction growth light systems.

Use/Operation

Rotating induction growth light system implementations are energy efficient, long lasting, and low heat generating. For example, rotating induction grow light system implementations may be used in indoor grow room applications for growing medical marijuana. Nevertheless, implementations are not limited to uses relating to the foregoing. Rather, any description relating to the foregoing is for the exemplary purposes of this disclosure, and implementations may also be used with similar results for a variety of other horticultural and agricultural applications, such as Food Agricultural Lighting, Green Houses Lighting, Indoor Organics Lighting, Hydroponic Lighting, Propagation and Seed Lighting, and the like.

For the exemplary purposes of this disclosure, FIGS. 12-15 depict a non-limiting implementation of a rotating induction growth light system in use with example medical marijuana plants. Here, while not shown specifically but implied with the up and down movement arrows, rotating induction growth light system may be used with a rope ratchet hanging system that allows the entire system to be hung above the plants and moved vertically up or down.

Figure 12:
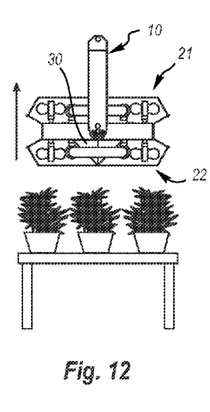
FIG. 12 is an in use end view of a rotating induction growth light system in a first position.

In FIG. 12, the plants are in a vegetative state, and as such the light source assembly 20 is in the first position with the vegetative side subassembly 22 facing towards the plants and away from the mounting bracket assembly 10. As the plants grow, the light source assembly 20 may be moved up vertically as desired to accommodate the growing plants while still providing the necessary light for optimal growing conditions.

Figure 13:
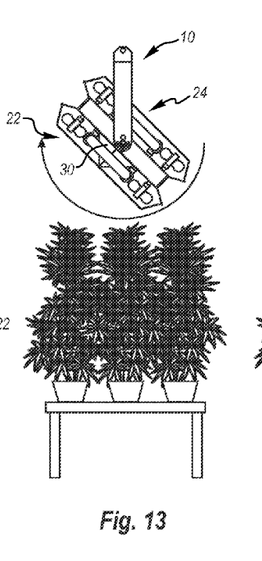
FIG. 13 is an in use end view of a rotating induction growth light system rotating from the first position shown in FIG. 12 to a second position.

In FIG. 13, the plants are transitioning or have transitioned to the flowering state, and so the light source assembly 20 can be rotated counterclockwise from the first position to the second position so that the flowering side subassembly 24 may face towards the plants and away from the mounting bracket assembly 10.

Figure 14:
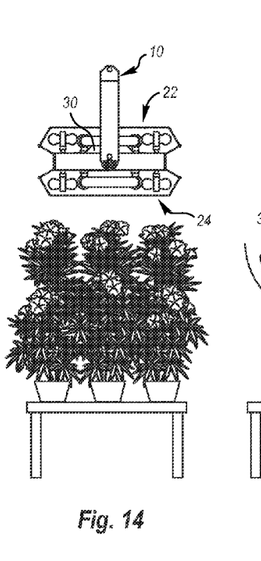
FIG. 14 is an in use end view of a rotating induction growth light system in a second position.

In FIG. 14, the plants are in the flowering state, and as such the light source assembly 20 remains in the second position wherein the flowering side subassembly 24 is facing the plant and away from the mounting bracket assembly 10.

Figure 15:
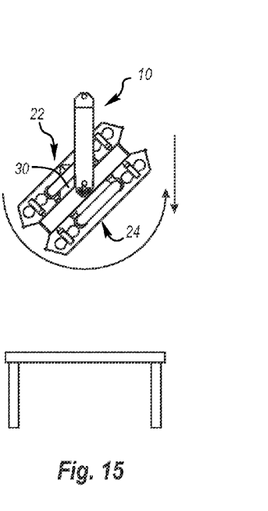
FIG. 15 is an in use end view of a rotating induction growth light system rotating from the second position to the first position.

In FIG. 15, the light source assembly 20 may be rotated back to the first position and lowered vertically in anticipation of new plants in a vegetative state being positioned below the light source assembly 20.

The invention claimed is:

1. A rotating induction growth light system, comprising:
a mounting bracket assembly;
a light source assembly rotatably coupled to the mounting bracket assembly, the light source assembly comprising a ballast mount rotatably coupled to the mounting bracket assembly and positioned between a first side subassembly and a second side subassembly, the first side subassembly having a reflector plate coupled to the ballast mount and a plurality of induction light bulbs coupled to the reflector plate, and the second side sub assembly opposite the first side subassembly having a reflector plate coupled to the ballast mount and a plurality of induction light bulbs coupled to the reflector plate, wherein the light source assembly is configured to rotate between a first position wherein the first side subassembly is facing away from the mounting bracket assembly and at least a second position wherein the second subassembly is facing away from the mounting bracket assembly.

2. The rotating induction growth light system of claim 1, wherein the first side subassembly further comprises a reflective cone.

3. The rotating induction growth light system of claim 1, wherein the plurality of induction light bulbs of the second side subassembly produce a first combined wattage and the plurality of induction light bulbs of the first side subassembly produce a second combined wattage less than the first combined wattage.

4. The rotating induction growth light system of claim 1, wherein the mounting bracket assembly comprises two arms and a body coupled to and between the two arms, at least one of the two arms comprising a track, and wherein the ballast mount comprises a stop tab slidable within the track such that when the light source assembly is in the first position the stop tab is engaged with a first end of the track and when the light source assembly is in the second position the stop tab is engaged with a second end of the track.

5. The rotating induction growth light system of claim 4, further comprising:
an indexing plunger operably coupled to the at least one of the two arms proximate the track; and
a plurality of plunger receiving holes on the ballast mount proximate the stop, wherein a first plunger receiving hole of the plurality of plunger receiving holes is positioned to engage with the indexing plunger when the light source assembly is in the first position, a second plunger receiving hole of the plurality of plunger receiving holes is positioned to engage with the indexing plunger when the light source assembly is in the second position, and a third plunger receiving hold of the plurality of plunger receiving holes is positioned to engage with the indexing plunger when the light source assembly is in a third position between the first and the second positions.

6. The rotating induction growth light system of claim 1, further comprising a plurality of ballasts coupled to the ballast mount.

7. The rotating induction growth light system of claim 3, wherein the plurality of induction light bulbs of the second side subassembly comprise two 300 watt bulbs, two 150 watt bulbs, and one 100 watt bulb, and the plurality of induction light bulbs of the first side subassembly comprise two 300 watt bulbs and two 150 watt bulbs.

8. The rotating induction growth light system of claim 3, wherein the plurality of induction light bulbs of both the first and second side subassemblies comprise two 500 watt bulbs.

9. A rotating induction growth light system, comprising:
a mounting bracket assembly;
a light source assembly rotatably coupled to the mounting bracket assembly, the light source assembly comprising a vegetative side subassembly and a flowering side sub assembly opposite the vegetative side subassembly, wherein the light source assembly is configured to rotate between a first position wherein the vegetative side subassembly is facing away from the mounting bracket assembly and at least a second position wherein the flowering subassembly is facing away from the mounting bracket assembly, wherein the light source assembly further comprises a ballast mount rotatably coupled to the mounting bracket assembly and positioned between the vegetative side subassembly and the flowering side subassembly; the flowering side subassembly comprises a reflector plate coupled to the ballast mount and a plurality of induction light bulbs coupled to the reflector plate; and the vegetative side subassembly comprises a reflector plate coupled to the ballast mount and a plurality of induction light bulbs coupled to the reflector plate of the vegetative side subassembly.

10. The rotating induction growth light system of claim 9, wherein the vegetative side subassembly further comprises a reflective cone.

11. The rotating induction growth light system of claim 9, wherein the plurality of induction light bulbs of the flowering side subassembly produce a first combined wattage and the plurality of induction light bulbs of the vegetative side subassembly produce a second combined wattage less than the first combined wattage.

12. The rotating induction growth light system of claim 11, wherein the mounting bracket assembly comprises two arms and a body coupled to and between the two arms, at least one of the two arms comprising a track, and wherein the ballast mount comprises a stop tab slidable within the track such that when the light source assembly is in the first position the stop tab is engaged with a first end of the track and when the light source assembly is in the second position the stop tab is engaged with a second end of the track.

13. The rotating induction growth light system of claim 12, further comprising:
   an indexing plunger operably coupled to the at least one of the two arms proximate the track; and
   a plurality of plunger receiving holes on the ballast mount proximate the stop, wherein a first plunger receiving hole of the plurality of plunger receiving holes is positioned to engage with the indexing plunger when the light source assembly is in the first position, a second plunger receiving hole of the plurality of plunger receiving holes is positioned to engage with the indexing plunger when the light source assembly is in the second position, and a third plunger receiving hold of the plurality of plunger receiving holes is positioned to engage with the indexing plunger when the light source assembly is in a third position between the first and the second positions.

14. The rotating induction growth light system of claim 11, wherein the plurality of induction light bulbs of the flowering side subassembly comprise two 300 watt bulbs, two 150 watt bulbs, and one 100 watt bulb, and the plurality of induction light bulbs of the vegetative side subassembly comprise two 300 watt bulbs and two 150 watt bulbs.

15. The rotating induction growth light system of claim 11, wherein the plurality of induction light bulbs of both the first and second side subassemblies comprise two 500 watt bulbs.

* * * * *